April 27, 1965  R. K. ULM  3,180,618
VEHICLE JACK STRUCTURE WITH ADJUSTABLE EFFECTIVE
LENGTH CHAIN TYPE LIFT MEANS
Filed Nov. 13, 1962  3 Sheets-Sheet 1

INVENTOR
RUSSELL K. ULM
BY Rommel, Allwine Rommel
ATTORNEYS

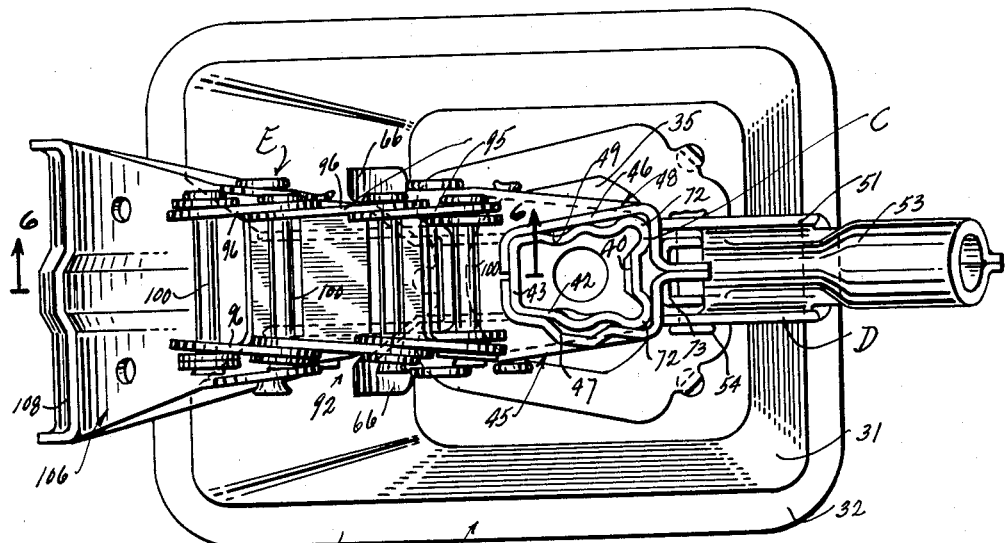

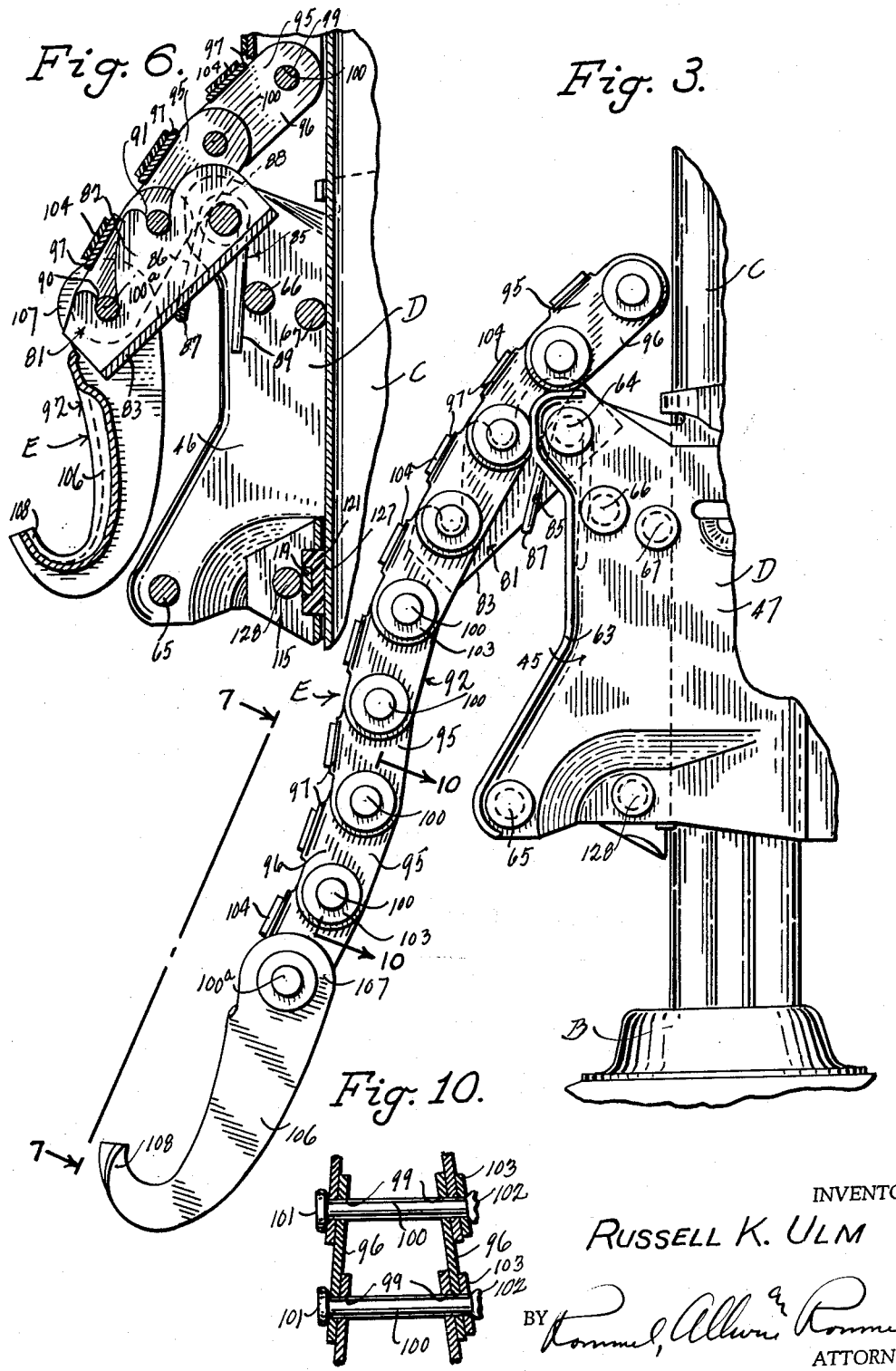

United States Patent Office 3,180,618
Patented Apr. 27, 1965

3,180,618
VEHICLE JACK STRUCTURE WITH ADJUSTABLE EFFECTIVE LENGTH CHAIN TYPE LIFT MEANS
Russell Keith Ulm, Butler, Ind., assignor to Universal Tool & Stamping Company, Inc., Butler, Ind., a corporation of Indiana
Filed Nov. 13, 1962, Ser. No. 236,918
6 Claims. (Cl. 254—109)

This invention relates to improvements in vehicle jacks.

The primary object of this invention is the provision of a vehicle jack having an improved chain type vehicle bumper engaging and supporting means, whereby to enable the same to be quickly adjusted to suit the dimensional characteristics of a vehicle bumper or frame, for lifting purposes.

In a previous application, Serial No. 156,399, filed December 1, 1961, I have disclosed an automobile jack having a flexible belt type lift member which can be adjusted to fit the height or dimensional characteristics of the bumper or frame of the vehicle to be lifted. It is the purpose of the present invention to improve on that jack structure in the provision of an improved chain made of links adapted to be quickly and adjustably fitted to a lift retainer of the slidable casing of the jack.

Other objects and advantages of this invention will be apparent during the course of the following detailed description.

In the accompanying drawings forming a part of this specification and wherein similar reference characters designate corresponding parts throughout the several views:

FIGURE 2 is a plan view of the jack structure shown in FIGURE 1.

FIGURE 3 is a fragmentary view showing a part of the jack structure of FIGURE 1, with a different length adjustment of the vehicle engaging lift chain than that shown in FIGURE 1.

FIGURE 5 is a side elevation, showing in fragmentary form the case of the jack structure as mounted upon the jack rack bar, with the lift retainer for the link chain shown in normal position prior to attachment of the lift chain thereto.

FIGURE 6 is a fragmentary cross sectional view taken substantially on the line 6—6 of FIGURE 2, showing details of the lift retainer and the chain links.

FIGURE 7 is a view of the lower portion of the link type chain, at the hook end, the view being taken at the angle designated by line 7—7 shown in FIGURE 3.

FIGURE 8 is a cross sectional view taken through the chain substantially on the line 8—8 of FIGURE 7.

FIGURE 9 is an end elevation of the lift retainer taken at the angle designated by the line 9—9 shown in FIGURE 5.

FIGURE 10 is a fragmentary cross sectional view taken through the chain structure, showing means for connecting the various links, the view being taken substantially on the line 10—10 of FIGURE 3.

Figure 1:
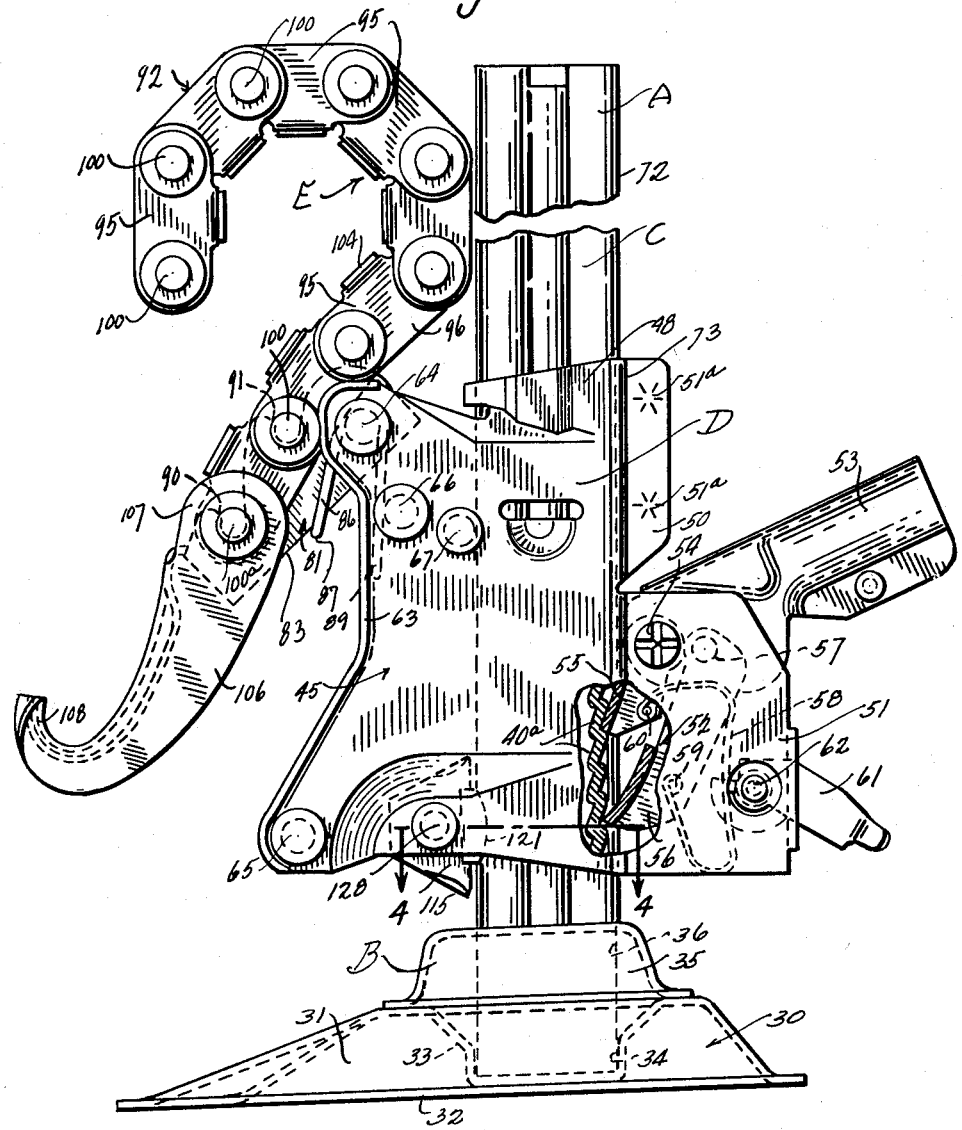
FIGURE 1 is a side elevation, partly in section of the improved jack structure, more particularly showing the improved vehicle engaging and lifting means associated therewith for a short length adjustment of the link type chain.

In the drawings, the letter A may generally designate the complete jack assemblage which includes a base B, rack bar C, movable lifting assemblage D and an improved means E for vehicle engagement.

The base construction B is known in the art, and includes a stamped metal inverted cup-shaped main portion 30 having a body 31 and foot flanges 32 surrounding the same. A downwardly depending socket portion 33 is formed integral with the portion 31. It has a rack bar receiving socket 34 in the lower portion thereof. Spot welded to the upper wall of the portion 31 is a dome 35 provided with an opening 36 therethrough for receiving the lower end of rack bar C.

The rack bar C is of polygonal tubular formation, and is constructed as described in a co-pending application Serial No. 156,398, filed December 1, 1961. So far as the present invention is concerned it consists of a rear wall 40, side walls 41 and 42 which extend at an angle of less than 90° with respect to the wall 40 and converge together and are connected to a front wall 43. The rear wall 40 has trackways 72 projecting rearwardly and extending the length of bar C which engage either an antifriction device (not shown) or the turned in wall portions 73 of the slide casing as shown in FIG. 2.

The lifting assemblage D preferably comprises a metal casing structure 45 having side walls 46 and 47 formed to provide a central portion 48 shaped to provide therethrough a passageway 49 slidably receiving the rack bar C. The upper rear portions of the walls 46 and 47, shown at 50 in the drawings, are welded together at 51$^a$ and the lower portions of the walls 46 and 47 have a rear pawl supporting extension 51. The pawl mechanism 52 is conventional and operates for the most part as set forth in a co-pending application Serial No. 156,398, filed December 1, 1961. The same includes a pawl actuated member 53 which is in effect a handle receiving socket pivoted at 54 on the extension 51. A short pawl 55 is also pivoted at 54 and adapted to act upon the rack teeth 40$^a$ of the bar C. A longer pawl 56 is pivoted at 57 on the extension 51 also adapted to act on the rack teeth 40$^a$. A looped spring 58 is provided in the housing for the assemblage D connected at one end at 59 to the lower end of the longer pawl 56 and connected at its other end at 60 to the lower end of the shorter pawl. The function of this spring is to urge the free ends of the pawls into engagement with the rack teeth. A trip lever 61 is pivoted at 62 upon the housing of the jack for engagement with the bight portion of the spring 58. When in the position shown in FIG. 1 the spring induces a compressive force large enough to overcome both the tensile and compressive forces introduced into the spring by the alternate up and down movements of the long pawl 56. When the trip lever 61 is lifted out of operation the up and down movement of the handle of the jack and the member 53 will result in the jack descending upon the rack bar C. The shorter pawl 55 will engage the teeth 40$^a$ and the load will be transferred from the short pawl to the long pawl 56. The lifting assemblage moves upwardly when the handle is moved downwardly and when the handle is rotated upwardly the longer pawl 56 is pulled upwardly in the next tooth 40$^a$ of the rack bar.

At the front of the rack bar, the walls 46 and 47 project appreciably forwardly of the front edge of the rack bar C and are spaced to receive details of the vehicle engaging lift mechanism E. The forward margins of the walls 46 and 47 are outwardly and laterally flanged as shown at 63 and these walls 46 and 47 are spaced at these locations. At their upper ends the walls 46 and 47 are transversely connected by a lift retainer supporting pin 64 the ends of which are peened or headed to prevent spread of the walls 46 and 47. At their lower ends the walls 46 and 47 support a similar pin 65 the ends of which are peened or headed at the outer sides of the walls 46 and 47. The outturned flanges 63 join the walls 46 and 47 on convex curves to admit the easy fitting sliding of the link chain between the walls when in lowered hanging position. As additional reinforcement the walls 46 and 47 may be transversely connected by other pins 66 and 67; the pin 66 cooperating with the lift retainer spring to be subsequently mentioned and the pin 67 operating as a guide which the forward face of the rack bar engages during sliding movement of the casing 45 over the rack bar, as is shown in FIG. 6.

Figure 4:
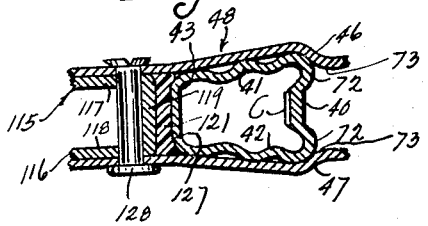
FIGURE 4 is a cross sectional view taken substantially on the line 4—4 of FIGURE 1.

As is set forth in my application Serial No. 156,399, filed December 1, 1961, it is proposed to provide a synthetic resin slide on the metal casing portion 45. This device generally indicated at 115 comprises a U-shaped metal clip 116 having attaching legs 117 and 118 which are recessed to receive a solid synthetic resin anti-friction member 121 as is shown in FIGS. 1 and 4 and more particularly described in my co-pending application Serial No. 156,399, filed December 1, 1961. The groove 127 fits the contour of the rear wall 43 of the jack and the entire device is held in place upon the walls 46 and 47 by a pin 128. The synthetic resin slide member 121 may be of solid nylon, or Du Pont "Delrin 500" which is an acetal resin known as polyoxymethylene.

The lift retainer 81 is a channel shaped structure made of metal and including spaced side walls 82 and a connecting bight wall 83. The walls 82 at their upper ends are apertured for pivotal mounting on the pin 64, as is shown in FIGS. 5 and 6 of the drawings. The lift retainer has its side walls spaced from the side walls 46 and 47 of the case 45. The lift retainer has a spring 86 of general U-shaped construction, including side legs 86 at the outer sides of each of the walls 82 and a bight portion 87 lying beneath the wall 83, as shown in FIG. 6. The legs 86 at their upper ends are coiled at 88 around the pin 64 and then extend downwardly to provide legs 89 which engage the pin 66. This holds the spring under slight compression, normally tending to urge the lift retainer to the position shown in FIG. 5. In this position it will be noted that the chain receiving sockets 90 and 91 on each wall 82 will be about vertically positioned to permit easy reception of the chain pins therein.

The lift means E further includes the chain and hook structure generally indicated at 92, adapted to be removably seated in various positions of its length upon the lift retainer 81. This chain and hook structure 92 is completely detachable from the lift retainer and other details of the jack structure, so that it can be carried as a separate unit in an out of the way position when the jack is collapsed and not in use.

The articulated chain structure is formed of a plurality of links 95. They are formed of rigid metal and each include relatively divergent side walls 96 shown in FIG. 10 connected by a narrow outer wall 97 shown in FIG. 8. The walls 96 extend beyond the cross edges of the connecting wall 97 and at these locations they are apertured at 99 to receive pins 100 which connect the various links in pivoted relation, one to the other. The pins 100 have heads 101 at one end and at the other end they are peened at 102 and rest against washers 103. If desired, washers may be placed at both ends of the pins 100 at each outer side of the walls 96. Due to the relative slope of the walls 96, links 95 can be conveniently interfitted, as is shown in FIG. 10, to provide a very compact and economically fabricated structure. The pins 100 are uniformly spaced, and are in parallelism, so that they will accurately fit into the sockets 90 and 91 of the lift retainer 81. When in position it will be noticed that the cross walls 97 lie beyond the lift retainer, as is shown in FIG. 6. If desired friction pads 104 may be attached on the outer surfaces of the cross walls 97 to prevent marring of bumpers and other vehicle parts with which the chain may come in contact during a lifting operation.

The chain structure at its lower end is provided with a bumper or vehicle frame engaging hook 106 having top ears 107, apertured to pivotally receive the lowermost pin 100ª of the lowermost link. The hook side walls are divergently flared as shown in FIG. 7. The end 108 is hooked for engagement beneath a vehicle frame or bumper.

The ease of application and use of the improved lifting means E upon the jack will be apparent from the drawings. After the casing has been properly assembled upon the rack bar, the lift retainer will assume the position shown in FIG. 5. The user can then gauge the height of the casing 45 with respect to the bumper or part of the vehicle frame to be hooked onto, and then positions the chain on the lift retainer 81 as shown in FIG. 1 where the hook 106 will be very close to the casing 45, or the chain can be extended substantially its full length or even its full length and socketed upon the lift retainer 81; as shown in FIG. 3 of the drawings, where the hook 106 lies appreciably below the casing 45.

All of the parts of the device are of rigid stamped and bent metal or other material, with the exception of the padding 104 and the anti-friction slide 121. It will be noted that the spring 85 normally holds the lift retainer in position for easy application of the chain and it likewise enables the lift member to be pressed downwardly at its free end so the hook 108 may be easily applied beneath the bumper flange or other vehicle part. The spring action then engages the toe of hook 108 beneath the bumper when the lift member is released.

Various changes in the size, shape and arrangements of parts may be made to the form of invention shown, without departing from the spirit of invention or scope of the claims.

I claim:

1. In a vehicle jack structure the combination of a supporting standard, a lifting member slidably mounted upon the supporting standard, means to move said lifting member along said standard in either direction, a retaining member pivotally mounted on said casing having a plurality of upwardly facing spaced sockets, a flexible chain comprising a plurality of relatively pivotally connected links connected together by pins, said pins being exposed so they can be releasably seated in said sockets of the retainer for supporting the chain in vehicle lifting position, and spring means normally urging the retainer outwardly and upwardly with respect to the standard.

2. In combination with a jack standard and a pawl operated casing slidably mounted for movement therealong, a link type chain comprising a plurality of rigid links pivotally connected together by cross pins, said lift chain at its free end having a lift hook connected therewith, and a retainer mounted on said casing having a plurality of upwardly facing sockets, for detachably receiving the pins of a selected link whereby to establish a selected distance between the retainer and the hook.

3. In a jack construction the combination of a rack bar having ground supporting means at the lower end thereof and teeth located therealong, a lifting casing slidably mounted upon the rack bar, pawl means movable upon the casing structure for engaging the teeth of the rack bar to move the casing along the rack bar, an elongated lifting chain comprising a plurality of links relatively connected together by transverse cross pins and a pivoted chain supporting retainer mounted on said casing having means for selectively receiving the pins of the links in order to support the chain with a desired effective length.

4. In a vehicle jack structure the combination of a supporting standard, a casing slidable along the supporting standard, means to move and anchor the casing along said standard, a flexible chain comprising a plurality of relatively pivotally connected links, vehicle engaging means on the chain at the outermost link, said chain links having individual cross members thereon, and a pivoted retainer mounted on said casing having sockets for releasably and selectively supporting said cross members whereby to establish a chain having a desired effective length.

5. The jack structure of claim 4 in which the pivoted retainer is normally resiliently urged outwardly and away from the casing and standard.

6. In a vehicle jack structure the combination of a supporting standard, a casing mounted on the supporting standard, means for moving and anchoring the casing upon said standard, a retaining member pivotally mounted on said casing and laterally extending therefrom provided with an upwardly facing socket, spring means mounted on said casing normally urging said retainer upwardly and outwardly with respect to the casing, a vehicle lifting chain comprising a plurality of links, and means connected with said links to seat in the socket of said retaining member whereby to support the chain with an effective desired length for lifting purposes.

References Cited by the Examiner

UNITED STATES PATENTS

| | | | |
|---|---|---|---|
| 2,165,366 | 7/39 | Gormley | 254—133 |
| 2,249,050 | 7/41 | Schmidt | 254—111 |
| 2,421,186 | 5/47 | Delano | 59—87 |
| 2,450,596 | 10/48 | Kais | 254—111 |
| 2,476,838 | 7/49 | Coffing | 254—133 |
| 2,807,929 | 10/57 | Gantz | 59—87 |
| 3,062,504 | 11/62 | Blanchard | 254—103 |
| 3,120,945 | 2/64 | Schultz et al. | 254—134 |

WILLIAM FELDMAN, *Primary Examiner.*

MILTON S. MEHR, *Examiner.*